(12) United States Patent
Stepan

(10) Patent No.: US 6,360,430 B1
(45) Date of Patent: Mar. 26, 2002

(54) STRIPPING MACHINE

(75) Inventor: Jiri Stepan, Sargans (CH)

(73) Assignee: Schleuniger Holding AG (CH)

( * ) Notice: Subject to any disclaimer, the term of this patent is extended or adjusted under 35 U.S.C. 154(b) by 0 days.

(21) Appl. No.: 09/255,039

(22) Filed: Feb. 22, 1999

Related U.S. Application Data

(63) Continuation-in-part of application No. PCT/EP97/04532, filed on Aug. 21, 1997.

(30) Foreign Application Priority Data

Aug. 21, 1996 (CH) .............................................. 2053/96

(51) Int. Cl.⁷ .............................................. H01R 43/00
(52) U.S. Cl. ........................... 29/825; 29/33 F; 81/9.51
(58) Field of Search ................................. 29/825, 33 F; 81/9.51; 33/732, 750, 751, 372, 501.02, 735

(56) References Cited

U.S. PATENT DOCUMENTS 4,745,828 A * 5/1988 Stepan
4,920,830 A * 5/1990 Stepan
4,981,054 A * 1/1991 Stepan
5,111,720 A * 5/1992 Stepan
5,596,802 A * 1/1997 Koch et al.

FOREIGN PATENT DOCUMENTS

RU 444283 * 4/1995 .................. 29/825
WO WO98/08283 * 2/1998

* cited by examiner

Primary Examiner—Carl J. Arbes

(57) ABSTRACT

The invention relates to a process and a device for measuring the length of a cable end, in particular in a cable stripping machine or the like, having clamping jaws and axially displaceable knife jaws and/or centering jaws on a sliding carriage with a controlled drive with the use of at least one contactless—in particular optical—sensor, which is moved under control along the cable in order exactly to detect the cable end. The cable is maintained in a relatively centered position but without force.

13 Claims, 2 Drawing Sheets

STRIPPING MACHINE

This application is a Continuation-in Part of International Application PCT/EP97/04532 filed Aug. 21, 1997 of the same inventor.

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

Field of the Invention

The invention relates to a stripping machine for optical or electrical conductors, in particular for coaxial cables, and a process for length measurement. European Patent Application EP-673099-A2 describes such a stripping device having clamping jaws, centering jaws and rotating blade devices. What is described in said European Patent Application as a preferred or advantageous measuring process, namely the measurement of the length of an inserted conductor end piece, can in practice have disadvantages. The process described in the Patent Application essentially comprises the axial holding of the cable end by means of the clamping jaws, closing the centering jaws up to the external cable diameter, whereupon the centering jaws remain pretensioned under a spring load on the external cable diameter, and the final, axial displacement of the centering jaws up to the end of the cable end, where the centering jaws—as intended in the Patent Application—close against one another under the spring force, which then leads to signal output from a pressure sensor.

However, this method can be disadvantageous precisely in the case of thin cables for which the present solution is mainly intended, in particular with soft outer sheaths, since, under the friction between centering jaws and outer sheath, the latter can be axially displaced relative to the inner layers of the cable, so that the sheath projects slightly beyond the conductor at the cable end, with the result that incorrect length detections may occur. In addition, the shielding may be damaged by the centering jaws of the known design during the stripping process, said centering jaws being acted on by a force.

SUMMARY OF THE INVENTION

The first object of the invention is to provide an improved length measuring process for cable ends in stripping machines.

The object is achieved by the following:

A process for operating a cable stripping device, having at least one of clamping jaws, axially displaceable blade jaws and centering jaws on a carriage with a controlled drive and at least one contactless sensor, the sensor being provided directly adjacent to at least one of the blade jaws and the centering jaws, including the following steps: fixing the end of the cable, after it has been inserted, by the clamping jaws in its processing position, gripping the cable end with at least one of the blade jaws or centering jaws on its outer sheath and centering said cable end, wherein the blade jaws or centering jaws satisfy at least one of the following conditions: at least one of the blade jaws and centering jaws: a) are positioned a small radial distance from the surface of the cable, the cable diameter being known; b) are applied to the cable surface with at least one of a small incidental force or without force; c) are raised from an applied state to a state in which they are applied to the cable surface with at least one of without force, a small incidental force and to a raised state, so that at least one of the blade jaws and centering jaws still hold the cable in a relatively centered position which satisfies at least one of the following conditions: without force and with a small incidental force, and moving at least one of the centering jaws and the blade jaws in an axial direction to the cable end, the presence of the inserted cable end being detected during the movement step, the actual cable end thus being detected in a contactless manner by the contactless sensor for further controlling operation of the stripping device.

The actual length of the cable end is thus determined, according to the invention, by detecting a certain axial displacement of the centering or blade jaws relative to the cable end (as known per se, but now with the jaws in a partly raised state or with jaws applied without force or with a small incidental force) from a defined position in the vicinity of the clamping jaws to the cable end, the insertion of a cable and reaching of the cable end with scanning being detected by a contactless, preferably optical sensor, which thus ends the measurement of the length of the displacement of the centering or blade jaws.

According to the invention, there are essentially three variants:

a) The centering and/or blade jaws are positioned a small radial distance from the cable surface, the cable diameter being known (by prior input of this value).

b) The centering and/or blade jaws are applied to the cable surface without force or with a small incidental force.

c) The centering and/or blade jaws are raised from an applied state to a state in which they are applied without force or with a small incidental force or to a raised state.

In the context of the invention, "small force" is understood as meaning a force which unintentionally occurs when an article (jaw) comes into contact with another article (cable), although it is not intended that one article rests against the other under the action of force. In any case, this small force is so small that, during a displacement of the two articles (jaw and cable) relative to one another, one article certainly has no interfering mechanical effect on the other.

A further object of the invention is to provide a process for operating a stripping device. This object is accomplished by the following process:

A process for operating a stripping device having clamping jaws blade jaws, and centering jaws, including the following steps: measuring the difference in cable length between an inserted cable end and a desired insertion length, gripping a cable by at least one of the blade jaws and the centering jaws at a position reflecting the difference in length as determined by measuring the length of the cable end, between the length of the inserted cable end and the desired insertion length, and displacing the cable in the axial direction to a desired axial cable end position, the clamping jaws releasing the cable during displacement of the cable.

In this process, the centering and/or blade jaws are preferably in the vicinity of the clamping jaws or are moved into the vicinity of the clamping jaws to begin centering the cable there or to begin the length measurement. This is advantageous, inter alia, because the clamping jaws themselves are generally also designed for centering and the cable can thus be readily enclosed there.

Optical sensors are nothing new in connection with stripping devices. Thus, Schleuniger Holding AG used stop sensors for cable ends as long ago as 1986, some of which sensors contain an optical light system in the sensor part for detecting a completed stop or the resultant small displacement of a sensor rod.

Komax has published, under the type number 324, a device which has an optical system and which is able to determine the stripping state of an already stripped cable in order thus to produce a signal or error message with digital processibility. In the European Patent Application mentioned above, the use of a light barrier is also proposed, which however is formed or intended only for the rough alignment and optical scanning of a conductor end section to be processed. Its function thus corresponds approximately to the above-mentioned function of the optical sensor in the stop sensor from Schleuniger. This sensor interacts with a sensor rod to indicate the arrival of a cable end.

However, optical sensors have not been used to date in cable processing for the measurement of the length of cables or cable ends.

The advantage over the known solution is that, in spite of relatively good centering (the cable can rest under its own weight gently against a centering or blade, e.g., V-blade jaw, damage to or displacement of a length of the sheath of the conductor is avoided and an exact determination of the conductor end is therefore possible. The optical sensor system preferably used according to the invention in this context thus permits—in interaction with a conventional length-measuring device—an exact measurement of the length of the conductor end piece from a starting point to the actually determined conductor end, along the axial displacement of the jaws, but—owing to the opening of the jaws in accordance with the invention—does so without producing errors due to frictional forces between jaws and cable.

Particular further developments and embodiments and variants of the invention are described and protected in the dependent claims.

An embodiment of the invention, which as such can also be used independently permits the mechanical and automatic adjustment of the cable end length to a desired value so that the correct (desires) length can be stripped even in the case of flexible cables and with inexact or manual introduction of such cables into a stripping machine. Such embodiment has the following features: A control includes a program and an input unit, to input a desired cable end axial position in the input unit, and wherein, if a set cable end axial position does not agree with the cable end position actually measured, the program actuates the clamping jaws and at least one of the centering jaws and blade jaws alternately, so that at least one of the blade jaws and centering jaws clamp the cable and displace the cable in the axial direction to the desired axial position while the clamping jaws open at least slightly to release the cable for displacement.

By means of a preferred particular control, the jaws are held in a plane, for example a horizontal one, so that it is possible to introduce from above a conductor which interrupts the light barrier and thus triggers the clamping jaws. The clamping jaws close and hence themselves produce a certain centering. In this case, the light barrier can also be arranged between clamping jaws and centering jaws.

Conventional light barriers, optionally also reflection sensors, may be used as the light barrier.

With regard to the resolution in the fine range, however, light barriers are recommended. For example, a light barrier "DL 20 or DLM 30" from STM Sensortechnologie, München GmbH could be used for an embodiment. With a standard amplifier, a resolution of 0.2 mm cable diameter can be achieved with these light barriers. For even finer resolution or optionally also for detecting stripping stages, said light barriers can be further improved with a high-resolution amplifier so that the resolution increases with a wire diameter of less than 0.05 mm. In the embodiment, the types V6/V7 for standard resolution or V62/V72 for high-resolution amplification from said company STM could therefore be used as amplifiers.

In the present application, reference is constantly made in particular to centering or blade jaws. However, structures which are not based exclusively on jaws but, for example, also comprise centering or stripping devices which are other than jaw-like are also within the scope of the invention. For example, funnel-like devices can also be used for the centering and laser blades, disc-like blades rotating about their own axis, or the like, can also be used for the cutting.

BRIEF DESCRIPTION OF THE DRAWINGS

The invention is described by way of example in more detail with reference to specific embodiments taken together with the drawings in which.

DETAILED DESCRIPTION OF PREFERRED EMBODIMENTS

Figure 1:
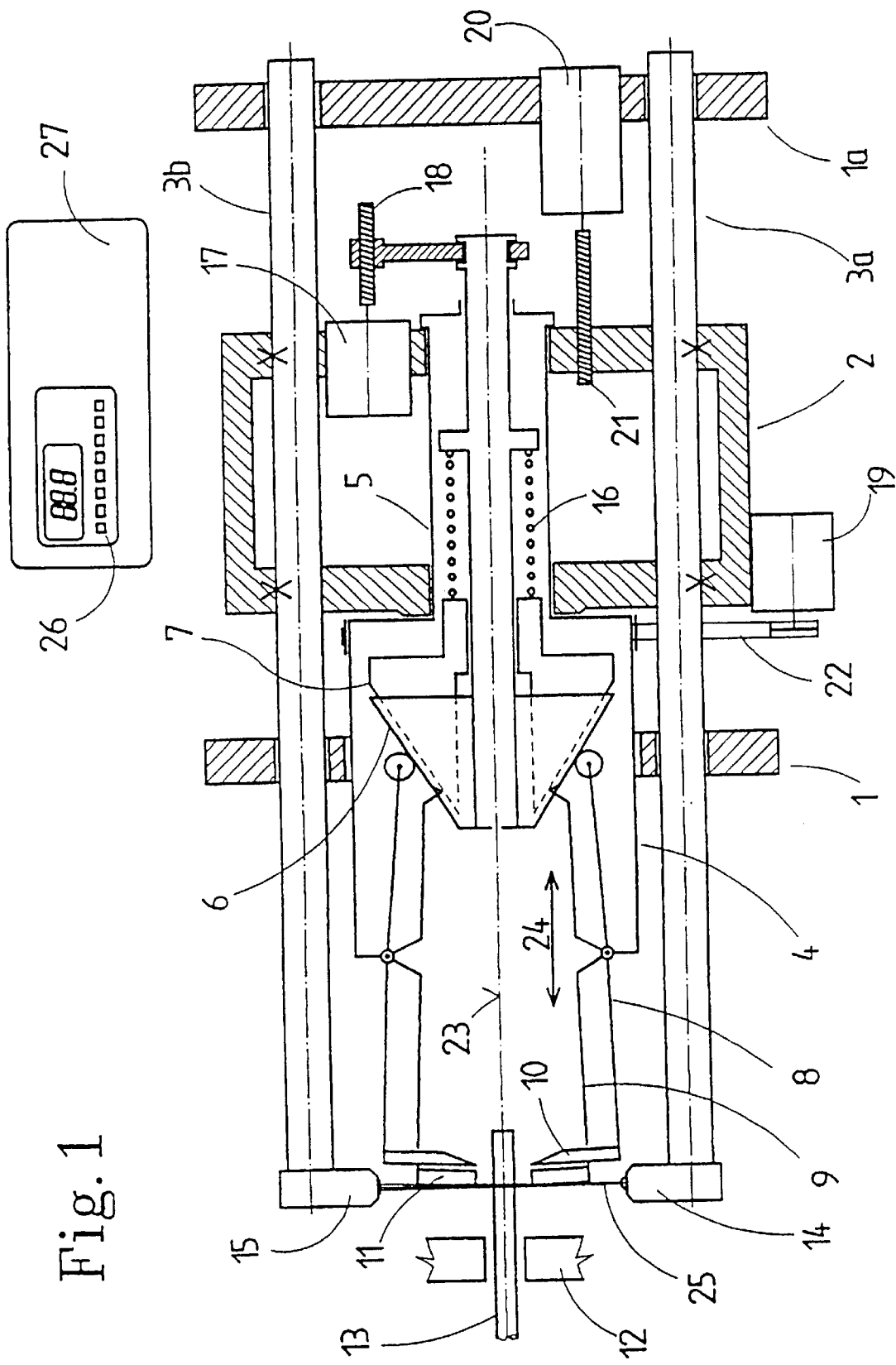
FIG. 1 shows, in section, a structure according to the successfully used type 207 from Schleuniger Holding AG with guide rods extended according to the invention and a light barrier, with opened centering and blade jaws.

The Figures are described in relation to one another. There is no need to discuss in further detail the basic mechanical design of this stripping device shown by way of example, since this has been disclosed by way of example by European Patent EP-B1-195932 and also, for example, by the type 207 from Schleuniger. The relevant figure description and figures in this cited European Patent EP-B1-195932 are hereby expressly incorporated herein by reference.

What is novel in the device according to the invention is extended guide rods 3a, 3b which are arranged in a mirror image around the centering or rotation axis 23 and are rigidly connected to a sliding carriage 2, which carries, in an axially nondisplaceable manner, also the rotating part, in particular the stripping jaw blades 10 and the centering jaws 11.

Of course, the invention also relates to variants having nonrotating centering jaws or stripping blades, as known, for example, from the types US 2015 and 2500 from Schleuniger.

In the context of the invention, it is also possible to provide a plurality of guide rod pairs 3a, 3b, which are mounted in each case as a mirror image around the centering or rotation axis 23. The guide rods 3a, 3b carry optical sensors—transmitters and receivers—at their ends closest to the cable. Since both the guide rods 3a, 3b and the centering jaws 11 and stripping blades 10 are fixed axially relative to one another over the sliding carriage 2, there is a fixed distance between the line of intersection of the stripping blades 10 and the light beam 25 of the optical sensors 14 and 15. If the sliding carriage 2 is displaced along the axis 23 as indicated by the arrow 24, the light beam 25 moves along the cable 13 inserted for stripping. In the position shown in FIG. 1, this could lead to an inexact measuring process if the cable 13 were to project into the stripping device not rigidly and centered as shown but flexibly and in a spatially undefined manner.

Figure 2:
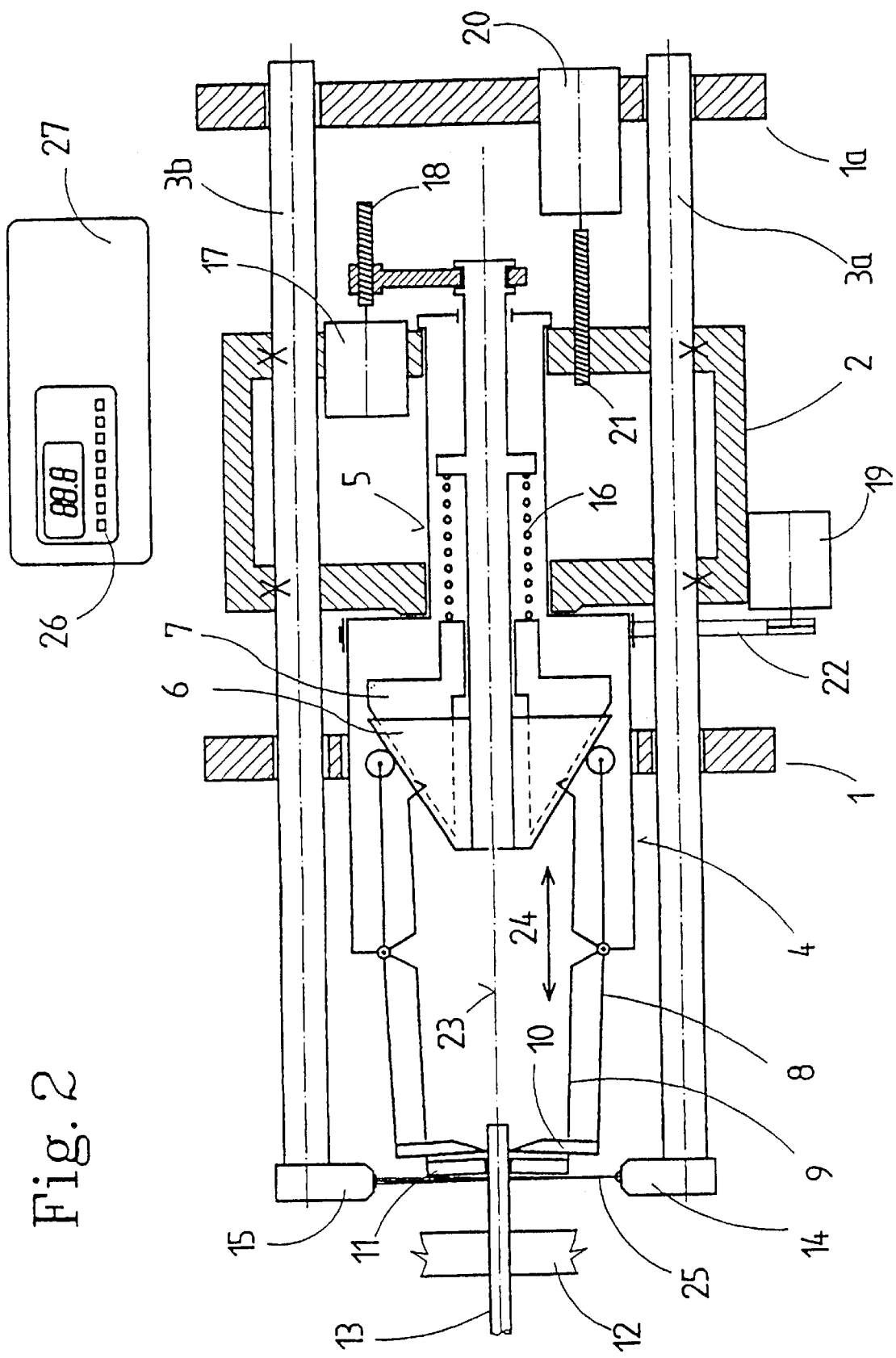
FIG. 2 shows the same structure with closed centering jaws.

It is here that the invention is effective by, as indicated in FIG. 2, fixing the cable 13 axially by closed clamping jaws 12 and centering it by centering jaws 11 which are lightly closed—i.e. in contact with the cable without force or with a small incidental force. Preferably, the centering jaws 11 are formed concave for this purpose, as known per se. However, if the centering and/or blade jaws are to rotate during the measuring process, a flat formation thereof is also possible. A further variant arises through the use of centering jaws as described, for example, in European Patent EP-B1-297484, since these center on a plurality of sides even in the nonrotating state. Regarding the more detailed design of such a centering jaw and/or blade arrangement, the figure description of this European Patent EP-B-1-297484 is therefore expressly incorporated herein by reference.

The invention relates not only to structures having centering jaws; it would also be possible to provide other centering devices and/or the blades might be formed in such a way that they perform a centering function, e.g., V-blades.

However, the invention comprises a further aspect apart from the sensor determination or photoelectrical exact determination of the machine end of the cable 13.

If the cable 13 is fixed by the clamping jaws 12 as shown in FIG. 2 and the length-measuring process is completed by displacement of the sliding carriage 2 in the direction of the arrow 24, it is possible, according to this special embodiment of the invention, to detect any insufficient length of the cable end. The insufficient length is then eliminated, according to the invention, by the following process steps: the centering jaws 11 and/or stripping blades 10 grip and fix the cable 13. The clamping jaws 12 open slightly and the sliding carriage 2 travels, with the centering jaws 11 and the cable 13, the insufficient length to the right according to the arrow direction 24.

The same process, except in the reverse direction to the left, can take place if an undesired excess length of the cable were detected.

The definitive length measurement can be performed without problems by means of an electronically controlled drive 20 of the sliding carriage 2. In the context of the invention, however, all other known length measurement processes can of course also be used on the sliding carriage.

LIST OF REFERENCE SYMBOLS 1, 1a Fixed frame
2 Sliding carriage
3 Guide rods
4 Stripping head, preferably rotatable
5 Head shaft
6 Wedge surface for knife lever
7 Wedge surface for centering jaw lever
8 Blade lever
9 Centering jaw lever
10 Stripping blade
11 Centering jaw
12 Clamping jaw
13 Conductor or conductor end
14 Optical sensor
15 Optical sensor
16 Pressure spring for centering jaw
17 Drive motor for control with encoder, stepping motor, potentiometer controlled or the like
18 Threaded spindle for knife/centering jaw control
19 Motor for head rotation
20 Motor for longitudinal feed with encoder, stepping motor, potentiometer-controlled or the like
21 Threaded spindle for sliding carriage feed
22 Drive belt
23 Centering or rotation axis
24 Arrow
25 Light beam
26 Input unit
27 Electronic control

I claim:
1. A process for operating a cable stripping device, having at least one of clamping jaws, axially displaceable blade jaws and centering jaws on a carriage with a controlled drive and at least one contactless sensor, the sensor being provided directly adjacent to at least one of the blade jaws and the centering jaws, including the following steps:
fixing the end of the cable, after it has been inserted, by the clamping jaws in its processing position,
gripping the cable end with at least one of the blade jaws or centering jaws on its outer sheath and centering said cable end,
wherein the blade jaws or centering jaws satisfy at least one of the following conditions: at least one of the blade jaws and centering jaws:
 a) are positioned a small radial distance from the surface of the cable, the cable diameter being known;
 b) are applied to the cable surface with at least one of a small incidental force or without force;
 c) are raised from an applied state to a state in which they are applied to the cable surface with at least one of without force, a small incidental force and to a raised state, so that at least one of the blade jaws and centering jaws still hold the cable in a relatively centered position which satisfies at least one of the following conditions: without force and with a small incidental force, and
moving at least one of the centering jaws and the blade jaws in an axial direction to the cable end, the presence of the inserted cable end being detected during the movement step, the actual cable end thus being detected in a contactless manner by the contactless sensor for further controlling operation of the stripping device.

2. A process for operating a cable stripping device, having at least one of the clamping jaws, axially displaceable blade jaws and centering jaws on a carriage with a controlled drive and at least one contactless sensor, the sensor being provided directly adjacent to at least one of the blade jaws and the centering jaws, including the following steps: fixing the end of the cable in its processing position, after it has been inserted, by the clamping jaws,
gripping the cable end with at least one of the blade jaws or centering jaws on its outer sheath and centering said cable end,
wherein the blade jaws or centering jaws satisfy at least one of the following conditions, at least one of the blade jaws and centering jaws:
 a) are positioned a small radial distance from the surface of the cable, the cable diameter being known;
 b) are applied to the cable surface with at least one of a small incidental force or without force;
 c) are raised from an applied state to a state in which they are applied to the cable surface with at least one of without force, a small incidental force and to a raised state, so that at least one of the blade jaws and centering jaws still hold the cable in a relatively centered position which satisfies at least one of the following conditions: without force and with a small incidental force, and moving at least one of the centering jaws and the blade jaws in an axial direction to the inserted cable end, the presence of the inserted cable end being detected during the movement step, the actual cable end thus being detected in a contactless manner by the contactless sensor, gripping the cable with at least one of the centering jaws and the blade jaws at a position reflecting a difference in length, determined by measuring the length of the cable end, between the inserted cable end and a desired insertion length, and displacing the cable in the axial direction to the desired axial cable end position, the clamping jaws releasing the cable, during the displacement process.

3. A device for operating a cable stripping device, comprising clamping jaws, at least one of axially displaceable blade jaws and centering jaws, a sensor in the vicinity of the blade jaws and centering jaws for detecting a cable end, a controlled feed, a drive coupled with the blade jaws and centering jaws, said blade jaws and centering jaws having overlapping gripping surfaces that grip the sheath surface of the cable end for measurement, and a control which, in an operating state, controls the feed and the drive so that the gripping surfaces hold the cable with no more than a small play so that the gripping surfaces slide axially along the cable surface without applying force on the sheath surface and essentially without friction.

4. The process as claimed in claim 2, including the following additional steps:

providing centering jaws with at least one of prismatic and concave gripping surfaces facing one another, the gripping surfaces being arranged about a rotation axis of the centering jaws, making the axis of a cable to be stripped coincide with the rotation axis in the case of stripping, and touching the cable by all gripping surfaces that face one another.

5. The device as claimed in claim 3, wherein the control includes a program and an input unit, to input a desired cable end axial position in the input unit, and wherein, if a set cable end axial position does not agree with the cable end position actually measured, the program actuates the clamping jaws and at least one of the centering jaws and blade jaws alternately, so that at least one of the blade jaws and centering jaws clamp the cable and displace the cable in the axial direction to the desired axial position while the clamping jaws open at least slightly to release the cable for displacement.

6. The device as claimed in claim 3, wherein the sensor (14, 15) is connected to at least one centering jaw (11).

7. The device as claimed in claim 6, wherein the sensor (14, 15) is integrated in at least one centering jaw (11).

8. The device as claimed in claim 3, wherein the sensor comprises at least one light barrier (14, 15).

9. The device as claimed in claim 8, wherein the sensor comprises an extending light beam (25).

10. The device as claimed in claim 6, wherein the sensor (14, 15) is an optical sensor and light energy for the sensor (14, 15) is supplied or removed by optical conductors.

11. The process as claimed in claim 1, wherein the sensor (14, 15) is an optical sensor, and light energy is guided into or onto at least two nonrotating guide rods (3) which are opposite one another across a rotation axis and are rigidly connected to a sliding carriage (2), or wherein these guide rods (3) carry at least one sensor (14, 15), the centering jaws or blade jaws (10, 11) being held on the sliding carriage (2) in a known manner axially nondisplaceable relative to said carriage.

12. The device as claimed in claim 3, wherein the stripping device has a control program which, with respect to the actual cable end position in the operating state, approaches the respective programmed axial cutting position(s) and makes the cuts.

13. A process for operating a stripping device having clamping jaws, blade jaws, and centering jaws, including the following steps:

measuring the difference in cable length between an inserted cable end and a desired insertion length, gripping a cable by at least one of the blade jaws and the centering jaws at a position reflecting the difference in length as determined by measuring the length of the cable end, between the length of the inserted cable end and the desired insertion length, and displacing the cable in the axial direction to a desired axial cable end position, the clamping jaws releasing the cable during displacement of the cable.

\* \* \* \* \*